US007835591B2

(12) United States Patent
Lunetta et al.

(10) Patent No.: US 7,835,591 B2
(45) Date of Patent: *Nov. 16, 2010

(54) METHODS AND APPARATUS FOR GENERATING COMPOSITE IMAGES

(75) Inventors: Larry Lunetta, Sunnyvale, CA (US);
Elliot Jones, Menlo Park, CA (US);
Criss Harms, Los Gatos, CA (US);
Gerald McLaughlin, San Mateo, CA (US); David Sipes, San Mateo, CA (US)

(73) Assignee: Branders.com, Inc., San Mateo, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 11/943,540

(22) Filed: Nov. 20, 2007

(65) Prior Publication Data

US 2008/0130043 A1    Jun. 5, 2008

Related U.S. Application Data

(63) Continuation of application No. 09/758,648, filed on Jan. 10, 2001, now Pat. No. 7,302,114.

(60) Provisional application No. 60/176,956, filed on Jan. 18, 2000.

(51) Int. Cl.
*G06K 9/36* (2006.01)
*G09G 5/00* (2006.01)
*G06F 15/16* (2006.01)

(52) U.S. Cl. ................... 382/284; 345/629; 709/203

(58) Field of Classification Search ............... 382/284, 382/298, 305, 312; 345/629; 358/1.15; 709/203, 709/220, 238; 705/26, 27, 400; 707/609
See application file for complete search history.

(56) References Cited

U.S. PATENT DOCUMENTS 4,526,116 A    7/1985    Mannel (Continued)

FOREIGN PATENT DOCUMENTS

AU    9669582    3/1997

(Continued)

OTHER PUBLICATIONS

*Google Answers: Promotional product supplier margins*, http://answers.google.com/answers/threaddview?id=136800,(Aug. 5, 2006),5.

(Continued)

*Primary Examiner*—Kanji Patel
(74) *Attorney, Agent, or Firm*—Schwegman, Lundberg & Woessner, P.A.

(57) ABSTRACT

Various embodiments include an apparatus comprising a first image database, the first image database to store at least one first image file, wherein the at least one first image file includes a product image file including a digital photograph of a physical product and a header including a size and an imprint area for the physical product, a second image database, the second image database to store at least one second image file, and a server to receive a user selection of the at least one first image file and the at least one second image file, and to generate a composite image of a first image and a second image, wherein the first image includes the digital photograph of the physical product and the second image is positioned relative to the first image based on the size and the imprint area included in the header of the first product image file.

27 Claims, 14 Drawing Sheets

U.S. PATENT DOCUMENTS

| | | | |
|---|---|---|---|
| 4,796,201 | A | 1/1989 | Wake |
| 4,849,902 | A | 7/1989 | Yokoe |
| 4,873,643 | A | 10/1989 | Powell et al. |
| 4,931,929 | A | 6/1990 | Sherman |
| 5,274,715 | A | 12/1993 | Hsu |
| 5,570,291 | A | 10/1996 | Dudle et al. |
| 5,793,029 | A | 8/1998 | Goodwin |
| 5,870,771 | A | 2/1999 | Oberg |
| 5,880,740 | A | 3/1999 | Halliday et al. |
| 5,930,810 | A | 7/1999 | Farros et al. |
| 5,933,813 | A | 8/1999 | Teicher et al. |
| 6,061,686 | A | 5/2000 | Gauvin et al. |
| 6,083,267 | A | 7/2000 | Motomiya et al. |
| 6,085,126 | A | 7/2000 | Mellgren, III et al. |
| 6,144,388 | A | 11/2000 | Bornstein |
| 6,167,442 | A | 12/2000 | Sutherland et al. |
| 6,175,966 | B1 | 1/2001 | Wiesenthal |
| 6,196,146 | B1 | 3/2001 | Goldberg et al. |
| 6,226,412 | B1 | 5/2001 | Schwab |
| 6,281,874 | B1 | 8/2001 | Sivan et al. |
| 6,304,855 | B1 | 10/2001 | Burke |
| 6,307,568 | B1 | 10/2001 | Rom |
| 6,339,763 | B1 | 1/2002 | Divine et al. |
| 6,344,853 | B1 | 2/2002 | Knight |
| 6,535,294 | B1 | 3/2003 | Arledge et al. |
| 6,556,659 | B1 | 4/2003 | Bowman-Amuah |
| 6,606,744 | B1 | 8/2003 | Mikurak |
| 6,615,247 | B1 | 9/2003 | Murphy |
| 7,050,654 | B2 | 5/2006 | Lunetta et al. |
| 7,191,145 | B1 | 3/2007 | Lunetta et al. |
| 7,236,647 | B2 | 6/2007 | Lunetta et al. |
| 7,302,114 | B2 | 11/2007 | Lunetta et al. |
| 7,315,659 | B2 | 1/2008 | Lunetta et al. |
| 7,343,320 | B1 | 3/2008 | Treyz et al. |
| 2001/0031102 | A1 | 10/2001 | Lunetta |
| 2002/0062264 | A1 | 5/2002 | Knight |
| 2005/0238251 | A1 | 10/2005 | Lunetta et al. |
| 2005/0259883 | A1 | 11/2005 | Lunetta et al. |
| 2006/0031392 | A1 | 2/2006 | Lunetta et al. |
| 2007/0192210 | A1 | 8/2007 | Lunetta et al. |

FOREIGN PATENT DOCUMENTS

| | | |
|---|---|---|
| KR | 2001015936 | 3/2001 |
| KR | 2001068054 | 7/2001 |
| KR | 2001074593 | 8/2001 |
| WO | WO-9409440 A1 | 4/1994 |
| WO | WO-9632683 A1 | 10/1996 |
| WO | WO-9636023 A1 | 11/1996 |
| WO | WO-9708638 A1 | 3/1997 |
| WO | WO-9808176 A1 | 2/1998 |

OTHER PUBLICATIONS

*Promotional and Ad Specialty Products—Branders.com*, http://www.branders.com/s/ad-specialty.html,(Aug. 5, 2006),3.

*LogoSoftwear.com—Personalization FAQs—All about our personalized clothing, bags, and caps!*, http://www.logosoftwear.com/personalizationfaq.php,(Aug. 4, 2006),7.

"Adobe Photoshop 5.0 User Guide for Macintosh and Windows", *Adobe Photoshop 5.0 User Guide*, 90011345, (1998),1-2, 13.

"Alpha Channel—Webopedia Definition and Links", http://www.pcwebopaedia.com/TERM/A/alpha_channel.html,(Observed Nov. 30, 1999),1 pgs.

"Alpha Channel: What is it?", http://www.autodessys.com/forum//forum_archive/forumD/general/470.html,(Observed prior to Jan. 10, 2001),2 pgs.

"U.S. Appl. No. 09/758,648 Final Office Action mailed Apr. 21, 2006", 13 pgs.

"U.S. Appl. No. 09/758,648 Non Final Office Action mailed Oct. 5, 2005", 8 pgs.

"U.S. Appl. No. 09/758,648 Non Final Office Action mailed Feb. 26, 2007", 7 pgs.

"U.S. Appl. No. 09/758,648 Non Final Office Action mailed Apr. 20, 2005", 6 pgs.

"U.S. Appl. No. 09/758,648 Non Final Office Action mailed Jul. 29, 2004", 8 pgs.

"U.S. Appl. No. 09/758,648 Non Final Office Action mailed Nov. 4, 2003", 8 pgs.

"U.S. Appl. No. 09/758,648 Notice of allowance mailed Jul. 12, 2007", 5 pgs.

"U.S. Appl. No. 09/758,648 Notice of Allowance mailed Jul. 26, 2006", 6 pgs.

"U.S. Appl. No. 09/758,648 Response filed Nov. 29, 2004 to Non Final Office Action Jul. 29, 2004", 13 pgs.

"U.S. Appl. No. 09/758,648 Response filed Mar. 6, 2006 Non Final Office Action mailed Oct. 5, 2005", 15 pgs.

"U.S. Appl. No. 09/758,648 Response filed Apr. 30, 2004 to Non Final Office Action mailed Nov. 4, 2003", 17 pgs.

"U.S. Appl. No. 09/758,648 Response filed Jun. 26, 2007 to Non Final Office Action mailed Feb. 26, 2007", 15 pgs.

"U.S. Appl. No. 09/758,648 Response filed Jul. 7, 2005 to Non Final Office Action mailed Apr. 20, 2005", 12 pgs.

"U.S. Appl. No. 09/930,676 Final Office Action mailed Feb. 15, 2006", 10 pgs.

"U.S. Appl. No. 09/930,676 Non Final Office Action mailed Jun. 8, 2005", 10 pgs.

"U.S. Appl. No. 09/930,676 Notice of Allowance mailed Nov. 1, 2006", 4 pgs.

"U.S. Appl. No. 09/930,676 Response filed Oct. 6, 2006 to Non Final Office Action mailed Jun. 8, 2006", 16 pgs.

"U.S. Appl. No. 09/930,676 Response filed Aug. 9, 2004 to Non Final Office Action mailed May 7, 2004", 13 pgs.

"U.S. Appl. No. 09/930,676 Non Final Office Action mailed May 7, 2004", 5 pgs.

"U.S. Appl. No. 11/004,312 Notice of Allowance mailed Jul. 12, 2007", 5 pgs.

"U.S. Appl. No. 11/004,312 Non Final Office Action mailed Feb. 26, 2007", 8 pgs.

"U.S. Appl. No. 11/004,733 Non Final Office Action mailed Apr. 21, 2006", 10 pgs.

"U.S. Appl. No. 11/004,733 Notice of Allowance mailed Feb. 22, 2007", 5 pgs.

"U.S. Appl. No. 11/004,733 Response filed Jul. 21, 2006 to Non Final Office Action mailed Apr. 21, 2006", 10 pgs.

"U.S. Appl. No. 11/004,734 Notice of Allowance mailed Feb. 24, 2006", 5 pgs.

"CNET Resources—Info Source—Glossary—Alpha Blending", http://www.cnet.com/Resources/Info/Glossary/Terms/alphablending.html,(Observed Nov. 30, 1999),1 pg.

"CNET Resources—Info Source—Glossary—Alpha Channel", http://www.cnet.com/Resources/Info/Glossary/Terms/alphachannel.html,(Observed Nov. 30, 1999),1 pg.

Fraser, W. A., "Point of Sale Terminal Providing Promotional Messages During Checkout of Products—Scans Machine-Readable Product Code to Retrieve Price and Identify Product, Retrieving Price of Equivalent Product of Different Product Name and Displaying Price Difference", Derwent Acc. No. 1997-179506/199716,(Mar. 6, 1997),1 pg.

GIFTMUGS.COM, "Gift Mugs: Custom Decorated Ceramic Coffee Mugs", http://web.archive.org/web/19981202033543/www.giftmugs.com/admin/Virtual_sample.htm, (Archived Dec. 2, 1998),2 pgs.

Goodwin, J. C., "Electronic Price Label With Bar Code Reader—Has Bar Code on Rear of Overlay and Aligned Over Bar Code Reader When Overlay is Installed in Price Label", Derwent Acc.No. 1997-320178,(Mar. 22, 1997),1 pg.

Halperin, A. , et al., "Sales Promotion Data Processor System for Use in Sales Outlet—Determines Sale Prices on Bases of Stored Price Information, Stored Promotion Price Criteria and Input Criteria", Derwent Acc. No. 1996-477311,(Oct. 17, 1996),2 pgs.

Heckbert, P S., "Survey of Texture Mapping", *IEEE Computer Graphics and Applications*, 6 (11), (Nov. 1, 1986),56-67.

Park, H. J., "System and Method for Offering Catalogue of Promotion Sales Product Over OnLine Network", Derwent Acc. No. 2002—24191,(Jul. 13, 2001),1 pg.

Van Der Linden, Peter , "Just Java 1.2", Mountain View, Calif. : *Sun Microsystems Press*, 4th Edition,(1999),1-63.

"Adobe Photoshop 5.0 User Guide for Macintosh and Windows", Adobe Photoshop 5.0, (1998), pp. 1-11,13.

"U.S. Appl. No. 09/758,648, Response filed Nov. 29, 2004 to Non Final Office Action mailed Jul. 29, 2004", 13 pgs.

"U.S. Appl. No. 09/930,676, Final Office Action mailed Feb. 15, 2006", 10 pgs.

"U.S. Appl. No. 09/930,676, Non Final Office Action mailed May 7, 2004", 5 pgs.

"U.S. Appl. No. 09/930,676, Notice of Allowance mailed Nov. 1, 2006", 4 pgs.

"U.S. Appl. No. 09/930,676, Pre-Appeal Brief Request filed Jun. 15, 2006", 5 pgs.

"U.S. Appl. No. 09/930,676, Response filed Aug. 9, 2004 to Final Office Action mailed May 7, 2004", 13 pgs.

"U.S. Appl. No. 09/930,676, Response filed Oct. 6, 2005 to Final Office Action mailed Jun. 8, 2005", 16 pgs.

"U.S. Appl. No. 11/004,312, Non-Final Office Action mailed Feb. 26, 2007", 8 pgs.

"U.S. Appl. No. 11/004,312, Notice of Allowance mailed Jun. 6, 2006", 5 pgs.

"U.S. Appl. No. 11/004,312, Notice of Allowance mailed Jul. 12, 2007", 5 pgs.

"U.S. Appl. No. 11/004,312, Notice of Allowance mailed Sep. 22, 2006", 5 pgs.

"U.S. Appl. No. 11/004,312, Response filed Jun. 26, 2007 to Non-Final Office Action mailed Feb. 26, 2007", 11 pgs.

"U.S. Appl. No. 11/004,734, Comments on Reasons for Allowance filed Mar. 21, 2006", 2 pgs.

"U.S. Appl. No. 11/004,734, Preliminary Amendment filed Dec. 2, 2004", 5 pgs.

"U.S. Appl. No. 11/717,472, Final Office Action mailed Jun. 12, 2009", 18 pgs.

"U.S. Appl. No. 11/717,472, Non-Final Office Action mailed Jan. 29, 2010", 30 pgs.

"U.S. Appl. No. 11/717,472, Non-Final Office Action mailed Oct. 17, 2008", 21 pgs.

"U.S. Appl. No. 11/717,472, Response filed Mar. 17, 2009 to Non-Final Office Action mailed Oct. 17, 2008", 15 pgs.

"U.S. Appl. No. 11/717,472, Response filed Nov. 12, 2009 to Final Office Action mailed Jun. 12, 2009", 13 pgs.

"European Application No. 07018863.6, Office Action mailed on Dec. 11, 2009", 5 pgs.

"European Application Serial No. 07018863.6, Extended European Search Report mailed Apr. 29, 2008", 9 pgs.

"Images and pixels", [Online]. Retrieved from the Internet: <URL: http://cs.colgate.edu/faculty/nevison/cs122web/Unit 1 P.E/>, (Sep. 13 2008), 2 pgs.

Heckbert, P. S, "Survey of Texture Mapping", IEEE Computer Graphics and Application, 6 (11), (Nov. 1, 1986), pp. 56-67.

FIG. 12

METHODS AND APPARATUS FOR GENERATING COMPOSITE IMAGES

CROSS REFERENCE TO RELATED APPLICATIONS

This application is a continuation of and claims the benefit of U.S. patent application Ser. No. 09/758,648 filed on Jan. 10, 2001 now U.S. Pat. No. 7,302,114 entitled "METHODS AND APPARATUSES FOR GENERATING COMPOSITE IMAGES;" which claims the benefit of U.S. Provisional Patent Application No. 60/176,956 filed on Jan. 18, 2000, which applications are incorporated in their entirety herein by reference.

FIELD OF THE INVENTION

The present invention relates to the field of computer-generated images. Particularly, the present invention relates to the generation of composite images at a server utilizing image selections communicated via a Web browser over a network, such as the Internet.

BACKGROUND OF THE INVENTION

The sale of promotional products, also called advertising specialties, has traditionally been practiced as a broker-customer relationship where a commissioned broker presents, in-person, various product lines and decoration choices to a customer. For example, a customer may call a broker in regard to promoting their company at a client appreciation golf tournament. The broker presents the customer with various products, i.e., hats, shirts, mugs, etc., that can be decorated using selected decorative technologies, i.e., embroidery, silk-screening, etc. For example, the customer may select a green polo shirt with the intention that it be decorated with company logo, graphic, name or other text or symbol be in black embroidery above the shirt pocket. The broker then facilitates the coordination among the customer, product vendor, and decorators to supply the requested customized product by the time required by the customer.

Due to the large number of product manufacturers and decorators, the broker usually carries a selected product line from various manufacturers and utilizes a selected group of decorators to apply the necessary decoration to the product. The customer, therefore, is presented a limited group of products and options for decorating the product. Moreover, when choosing the product, the customer generally is looking at catalog images or samples that are blank—that is, undecorated or decorated with the design of another company. In these cases, the customer is left to imagine the appearance of the decorated product until after placing an order. Thus, typically, the customer usually does not see the final product until it arrives. Furthermore, until the product arrives, the customer must depend upon the broker to ensure the order is delivered on time and appears as was anticipated.

Thus, it would be desirable for a client to be able to select a product and a decoration at their convenience over a network, for example, the Internet, and to view the appearance of the final product.

SUMMARY OF THE INVENTION

Various embodiments of the present invention disclose methods and apparatus for generating composite images via a network. In one embodiment, a first image is selected via a Web interface presented on a browser. A second image is selected via a Web interface presented on the browser. The selection of the first image and the second image is communicated to a server via the network. The server generates a composite image of the first image and second image and communicates the composite image to the browser via the network.

BRIEF DESCRIPTION OF THE DRAWINGS

The present invention is illustrated by way of example and not limitation in the figures of the accompanying drawings, in which like references indicate similar elements and in which:

FIG. 12 is a Web interface presented on the browser that presents a quote according to one embodiment of the present invention;

DETAILED DESCRIPTION

Figure 1:
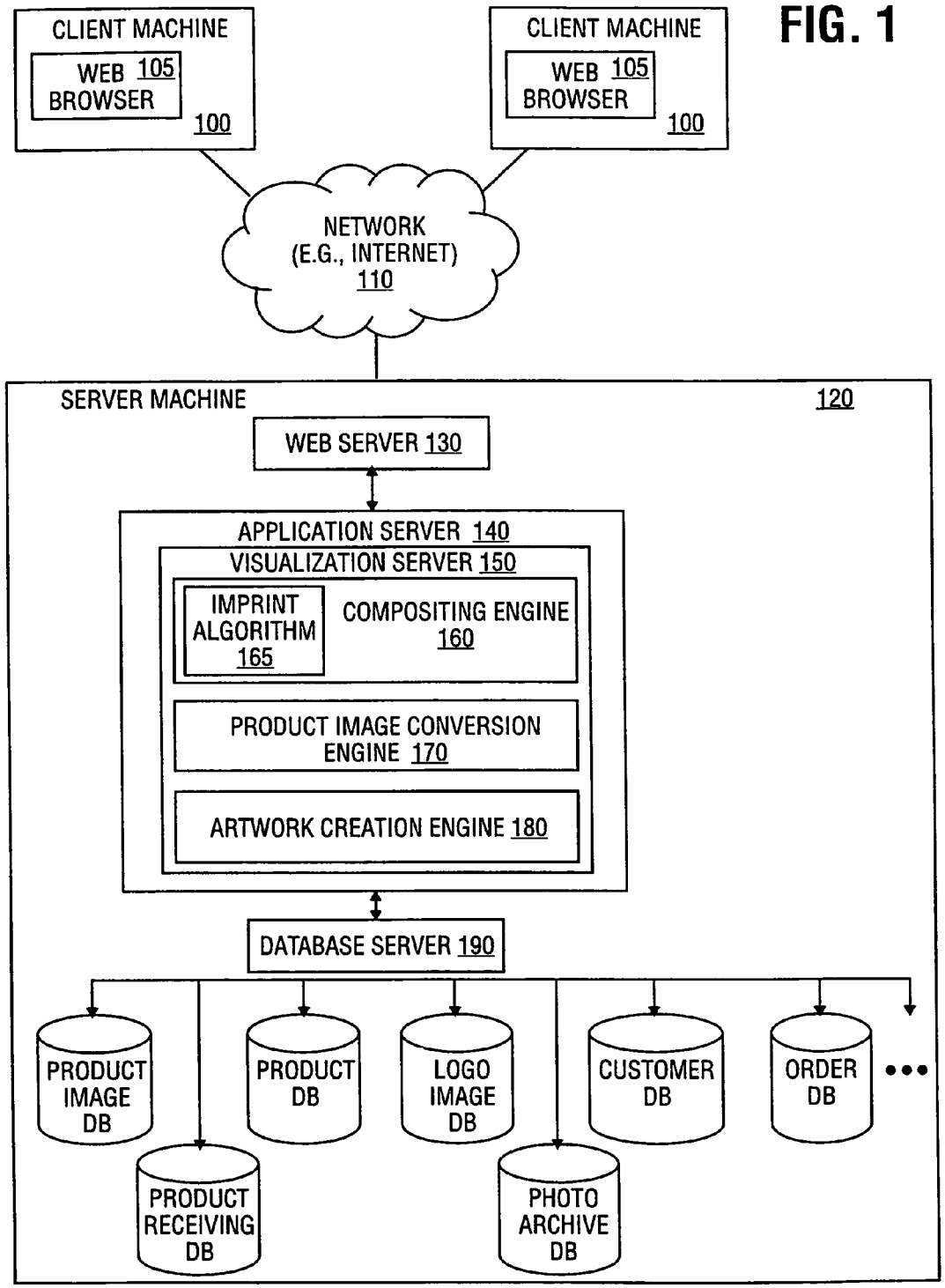
FIG. 1 is a diagram of a system architecture according to one embodiment of the present invention.

Although the present invention is described below by way of various embodiments that include specific structures and methods, embodiments that include alternative structures and methods may be employed without departing from the principles of the invention described herein.

In general, embodiments described below feature a network-based application that prompts a user for a product image selection and a decorative image selection and displays a product image (e.g., a photograph) with the decorative image (e.g., a logo graphic or text graphic) placed on it. A preferred embodiment of the present invention features a network-based application for composite image generation. For the purposes of the present specification, the term "product image" shall be taken to include any image type and may depict any type, shape or construction of product. The term "decorative image" shall also be taken to include any image type, and may depict, for example, any logo, text, pattern, ornamentation, name, symbol, emblem or the like that may be applied to a product.

In one embodiment, the present invention is implemented as a computer-based service that may be accessed through the Internet, for example, using a Web browser. The service provides an interface that allows a user to select a product and select and/or create decorative image information and view the composite image before ordering the promotional product.

Internet-Related Technology

As indicated above, one embodiment of the present invention provides an Internet-based implementation. Accordingly, some introduction to Internet-related technology is helpful in understanding the present invention. The Internet is a vast and expanding network of computers and other devices linked together by various telecommunications media, enabling the various components to exchange and share data. Sites (so-called Web sites), accessible through Internet, provide information about numerous corporations and products, as well as education, research, entertainment and services.

A resource that is attached to the Internet is often referred to as a "host." Examples of such resources include conventional computer systems that are made up of one or more processors, associated memory and other storage devices and peripherals, such as modems, networks interfaces and the like that allow for connection to the Internet or other networks. In most cases, the hosting resource may be embodied as hardware and/or software components of a server or other computer system that includes an interface module, which allows for some dialog with users and that may process information through the submission of Web forms completed by the user. Generally, such a server will be accessed through the Internet's graphical user interface, the World Wide Web, (e.g., via Web browsers) in the conventional fashion.

In order to facilitate communications between hosts, each host has a numerical Internet Protocol (IP) address. The IP address of a hypothetical host computer might be 112.222.64.27. Each host also has a unique "fully qualified domain name." In the case of the hypothetical host 112.222.64.27, the "fully qualified domain name" might be "computer.domain.com", the three elements of which are the hostname ("computer"), a domain name ("domain") and a top-level domain ("com"). A given host looks up the IP address of other hosts on the Internet through a system known as domain name service.

As previously indicated, in order to access the Internet most users rely on computer programs known as "Web browsers." Commercially available Web browsers include such well-known programs as Netscape's Navigator™ and Communicator™ and Microsoft's Internet Explorer™. If an Internet user desires to establish a connection with a Web page hosted at computer.domain.com, the Internet user might enter into a Web browser program the uniform resource locator (URL) "http://www.domain.com". The first element of the URL is a transfer protocol, most commonly "http" standing for hypertext transfer protocol, but others include "mailto" for electronic mail, "ftp" for file transfer protocol, and "nntp" for network news transfer protocol. The remaining elements of this URL are an alias for the fully qualified domain name of the host.

Once a URL is entered into the browser, the corresponding IP address is looked up in a process facilitated by a certain computer, called the top-level server. The top-level server matches the domain name to an IP address of a domain name server capable of directing the inquiry to the computer hosting the Web page. Thus, the domain name server ultimately matches an alphanumeric name such as www.domain.com with its numeric IP address 112.222.64.27.

When a host receives an inquiry from the Internet, it returns the data in the file pointed to by the request to the computer making the inquiry. Such data may make up a Web page, which may include a textual message, sound, picture, or a combination of such elements. A user can move between Web pages through the use of hyperlinks, which are links from one site on the Internet to another.

Figure 13:
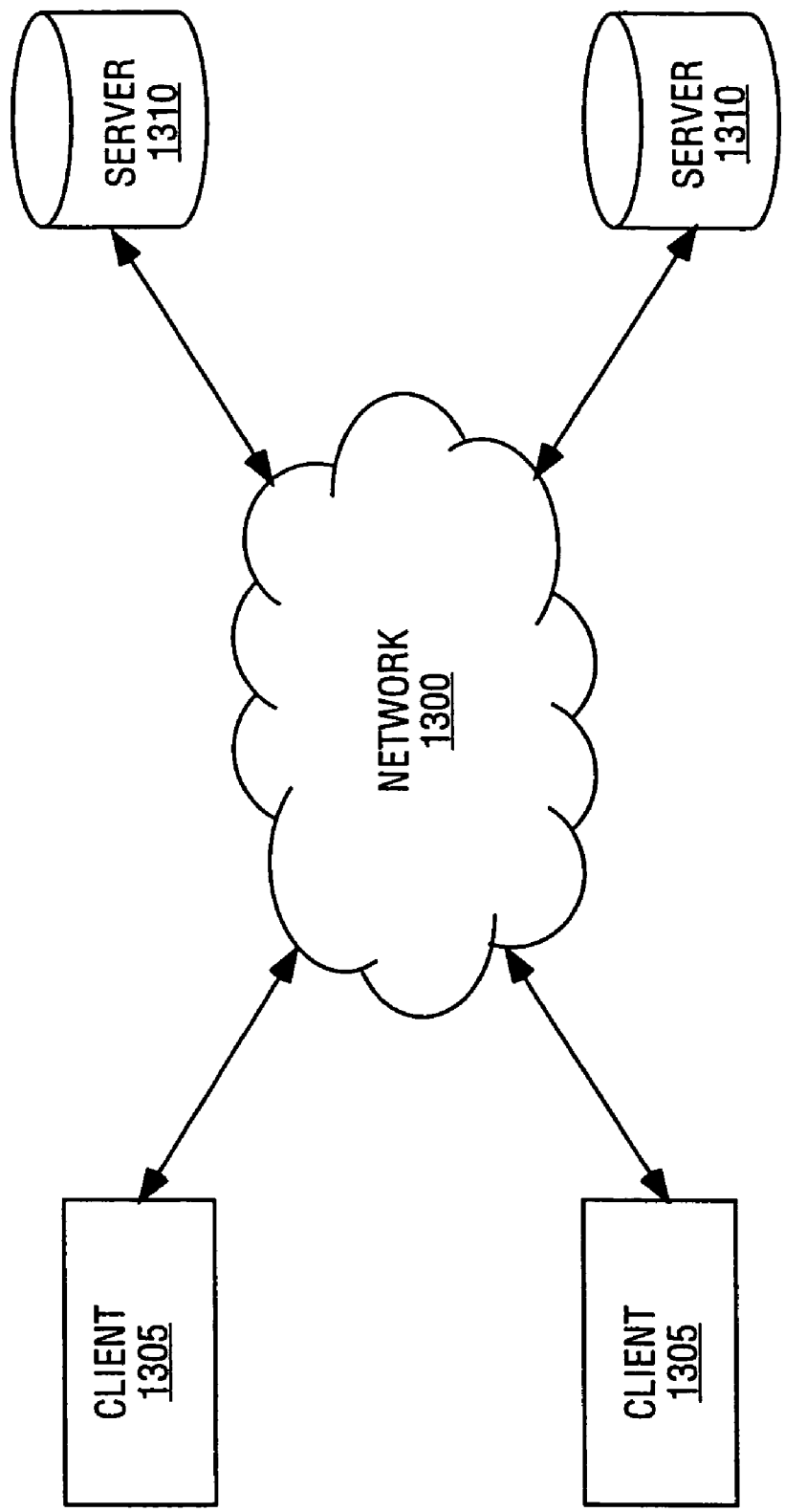
FIG. 13 is an example of a traditional client-server system upon which one embodiment of the present invention may be implemented.

An integral component of the present invention is a computer server. Servers are computer programs that provide some service to other programs, called clients. A client 1305 and server 1310 of FIG. 13 communicate by means of message passing often over a network 1300, and use some protocol, a set of formal rules describing how to transmit data, to encode the client's requests and/or responses and the server's responses and/or requests. The server may run continually waiting for client's requests and/or responses to arrive or it may be invoked by some higher-level continually running server that controls a number of specific servers. Client-server communication is analogous to a customer (client) sending an order (request) on an order form to a supplier (server) dispatching the goods and an invoice (response). The order form and invoice are part of the protocol used to communicate in this case.

Another component of the present invention is an alpha channel. An alpha channel is a portion of each pixel's data that is reserved for transparency information. Pixel is the smallest addressable unit on a display screen. Typically, the alpha channel is defined on a per object basis; different parts of the object have different levels of transparency depending on how much background needs to show through. In short, the alpha channel is a mask that specifies how the pixel's colors should be merged with another pixel when the two are overlaid, one on top of the other.

Architecture

With these concepts in mind, an embodiment of a system architecture of the present invention can be explored. A composite image generation service may be accessed through client machines 100 that run browser applications 105 to provide graphical interfaces for a user to effectively use the composite image generation service. The client machines 100 communicate with a server machine 120 via a network 110, e.g. Internet. The server machine 120 includes such components of the present invention as a web server 130, application server 140 and database server 150. It will be appreciated that these servers may run on other machines that are accessible by the server machine 120. In an embodiment of the present invention, databases for storing customer information, product image information, decorative image information, etc. are also stored at the server machine 120. However, it will be appreciated that databases may be stored at other machines and database data may be uploaded to the server machine 120 when necessary.

The application server 140 contains visualization server 150 that includes compositing engine 160, product image conversion engine 170 and artwork creation engine 180. Compositing engine 160 generates a composite image based on a first image and a second image selected by a user. A first image is, for example, uploaded by a manufacturer of a product depicted in the first image and processed by the product image conversion engine 170 for storage in a photo archive database 240.

Of course, the first image may be obtained from any number of sources. For example, an operator of a Web site that is supported by the server machine 120 may employ an internal photographic (or art) department that is responsible for generating images of products that are supplied, together with pertinent product information, to the Web site operator by manufacturers of such products. These internally generated photographs may be stored in a photograph archive database 260.

The second image is modified by the artwork creation engine 180 according to the user's operations in the Web browser. These image conversion processes are described in detail below. The database server 190 that communicates to the application server 140 contains databases 191 used for the composite image generation. As stated above the databases may be stored at another machine and accessed by the database server 190. Furthermore, the database server 190 may run at another machine and communicate with the application server 140 via the network 110.

Methodology and User Interface

With these concepts in mind, an embodiment of the present invention can be further explored. In order to produce a composite image, the first and the second images, for example product image and logo image respectively, must be processed for use by the compositing engine 160 of the visualization server 150. While the below exemplary embodiment of the present invention is described as utilizing "logo images", it will be appreciated that the present invention is not limited to the utilization of such logo images, and may employ a decorative image representing any decoration (e.g., a graphic, logo or text) that may be applied to product.

Before a product image and a logo image can be utilized by the composite image generator, in one embodiment, each is formatted as a raster file. It will be appreciated that the processing of the photo image need not occur at the server and may take place at another location with the processed product images that may be, for example, uploaded to the server via a network or generated by a Web site operator that operates the server machine 120.

In one embodiment of the present invention, a product image file is submitted by a manufacturer. For example, the product manufacturer submits a high-resolution product photo file, such as a file of 1.3 mega-pixel resolution.

Figure 2:
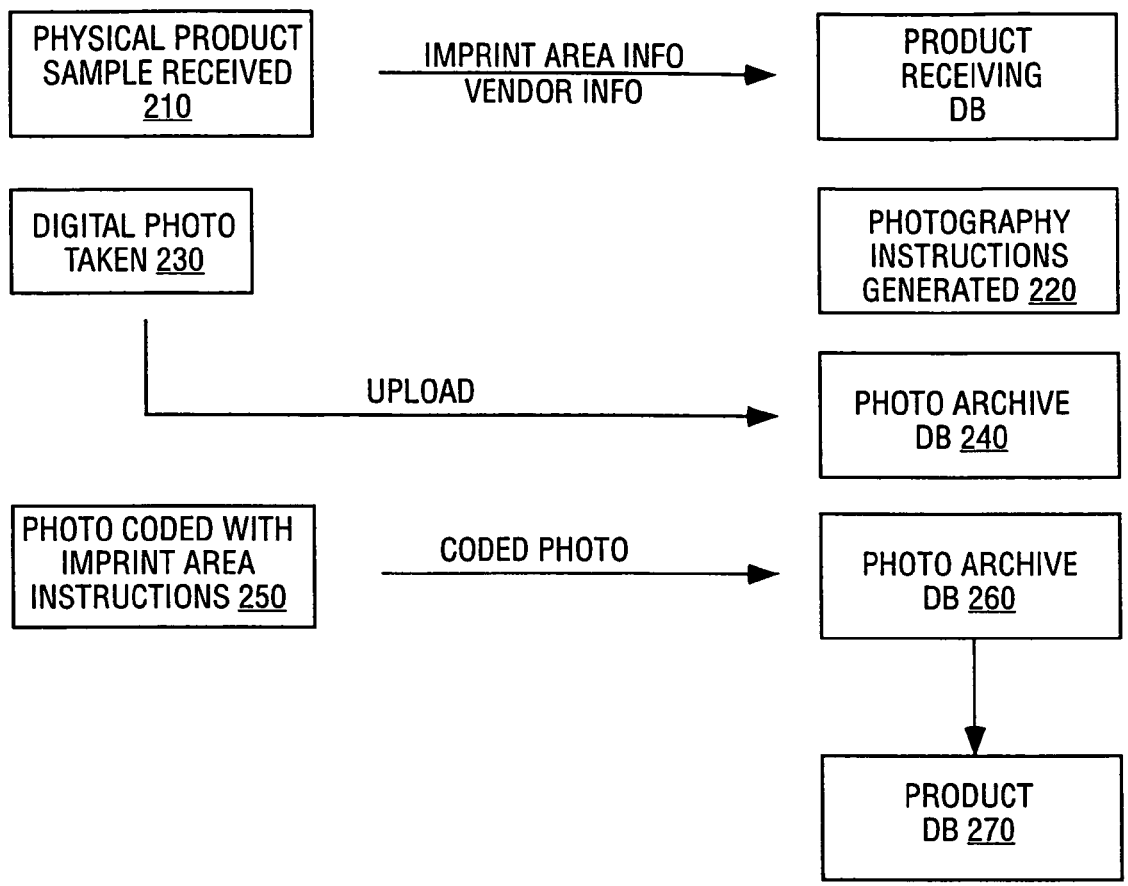
FIG. 2 is a flow diagram illustrating a product image processing according to one embodiment of the present invention.

In another embodiment of the present invention the manufacturer may submit a physical product sample at 210 of FIG. 2 with the product information, including size, imprint area, etc., that is stored in product receiving database by the compositing engine 160. Upon generation of photography instructions at 220, the digital photograph of the product is taken at 230 by, for example, a Web site operator that operates the server machine 120. The digital photograph is then uploaded to photo archive database 260. The coded photo with imprint area instructions in the header of a product image file is stored in product database 270.

In one embodiment, the product image processing may be done utilizing a commercially available software package, such as Adobe Photoshop™ (available from Adobe Systems of San Jose, Calif.) on Windows™ operating system (available from Microsoft Corporation of Redmond, Wash.). An alpha channel is defined using the selection tools in Photoshop™, and, at the same time, the diameter of the product is set and the warp ratio is automatically calculated based on the diameter of the product. The product photo export plug-in generates the product image file and product thumbnail file and saves it in the product image database, or saves it for uploading to the product image database by the product image conversion engine 170. In one embodiment, the product image database may be part of a product database where the product images are associated with a product; however, in other embodiments it may be a separate product image database associated with a product database. In an embodiment where the product images are processed at another system, the processed files are uploaded to the product image database. The product image file may be a .png file containing a high-resolution product image. It will be appreciated that product image files in addition to or other than the above image files may also be generated by the product photo export plug-in.

The next embodiment of the present invention is described with reference to the simplified flow diagram of FIGS. 3A and 3B. At operation 301, a customer on a client system 100 accesses the visualization server 150 via a network 110 (e.g., Internet), utilizing a network browser. The customer is presented on the browser with a Web interface (e.g., HTML document) communicated from the visualization server 150, and prompting the customer to enter a user identification (userid) and password in order to use the composite image generation service. First time users are prompted to enter customer information, e.g. name, address, phone number, billing address, payment information and are assigned a userid and password that are user-modifiable. Upon entering a userid and a password, the information is sent to the visualization server 150, where validation of the entered information is done against a customer database containing all the relevant customer information. Upon successful validation access to the composite image generation service is provided to the user at operation 302.

Figure 4:
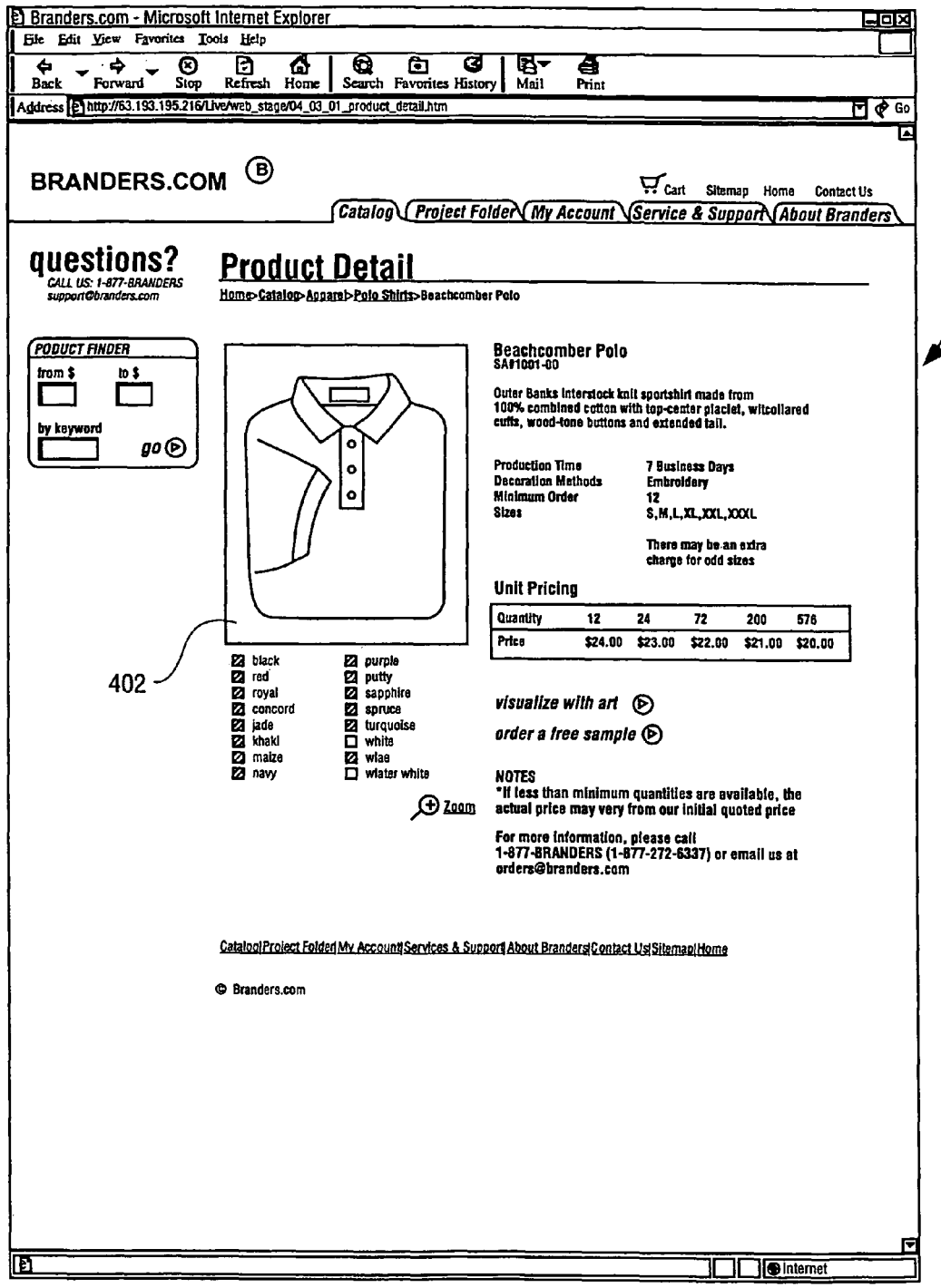
FIG. 4 is a Web interface presented on a browser that presents product details according to one embodiment of the present invention.
Figure 5:
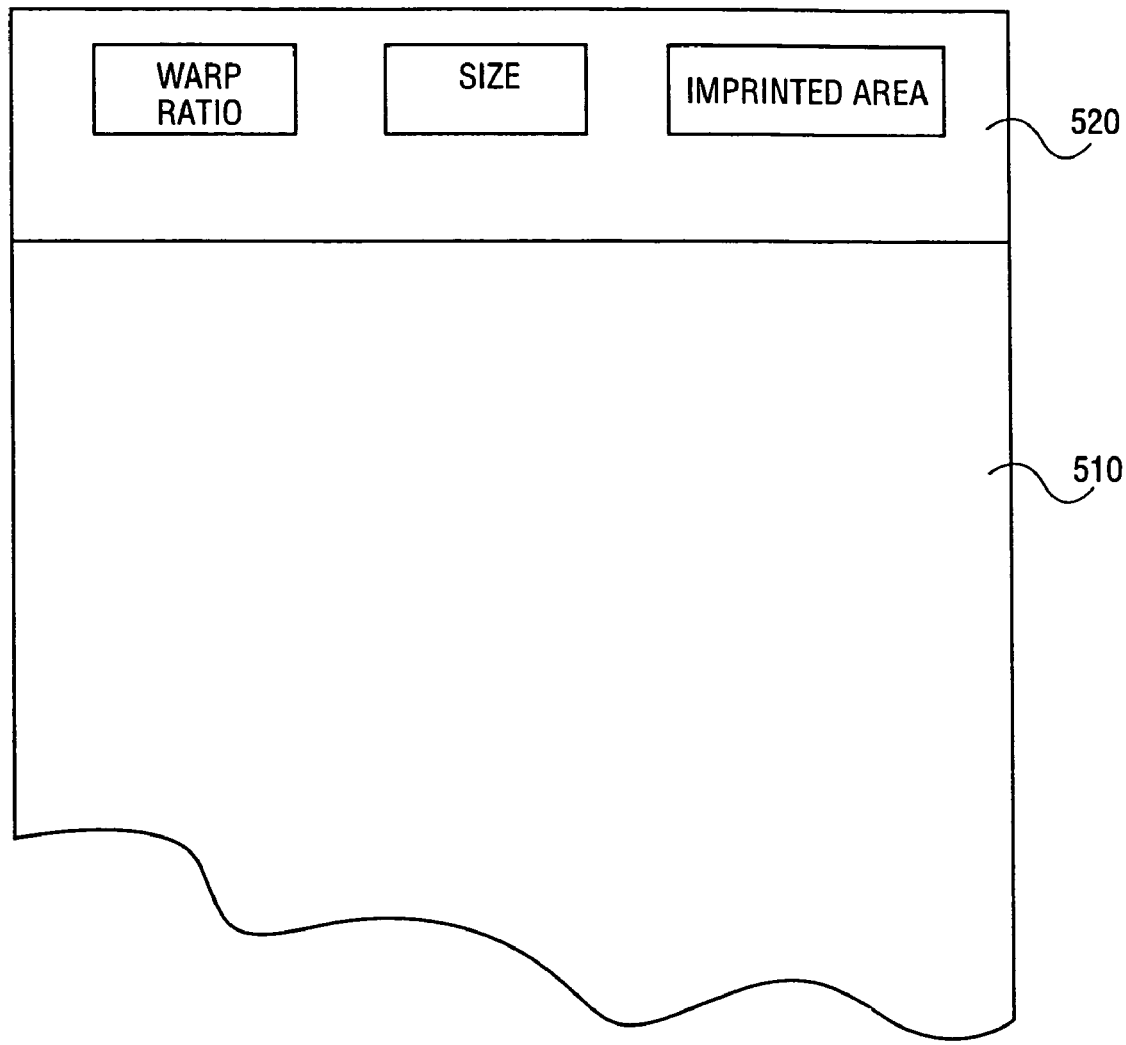
FIG. 5 is illustrating a product image file structure according to one embodiment of the present invention.

At operation 303 the user may browse a virtual product catalog or search for a specific product. If the user selects a search option then the visualization server 150, upon getting a search request, conducts a search for a product against a product database that may be stored on the server machine 120 or on another machine that is accessible by the visualization server 150. The user is presented with a list of all the products stored in the database or the list of products identified by the visualization server 150 as the result of a specific product search, along with thumbnail image of each product next to its name. Upon clicking on a thumbnail image the user may be presented with the enlarged photograph 402 of a product with the detailed description. An exemplary user interface 400 to present the enlarged photograph 402 is shown in FIG. 4. At this point 305 the user may select a product for design. A unique product identification number gets sent to the visualization server 150, which allows the server to select the correct product photo with the specialized imprint instructions from the product database. In one embodiment of the invention each product image may be stored in a file 510 with the header 520 containing information about the image, such as size, imprint area, warp ratio, etc., as illustrated in FIG. 5. It will be appreciated that the selected product image is maintained as an image file accessible at the server machine 120 and may reside as an image file in a separate product image database or may reside as an image file in part of a larger database, such as the product database.

Figure 6:
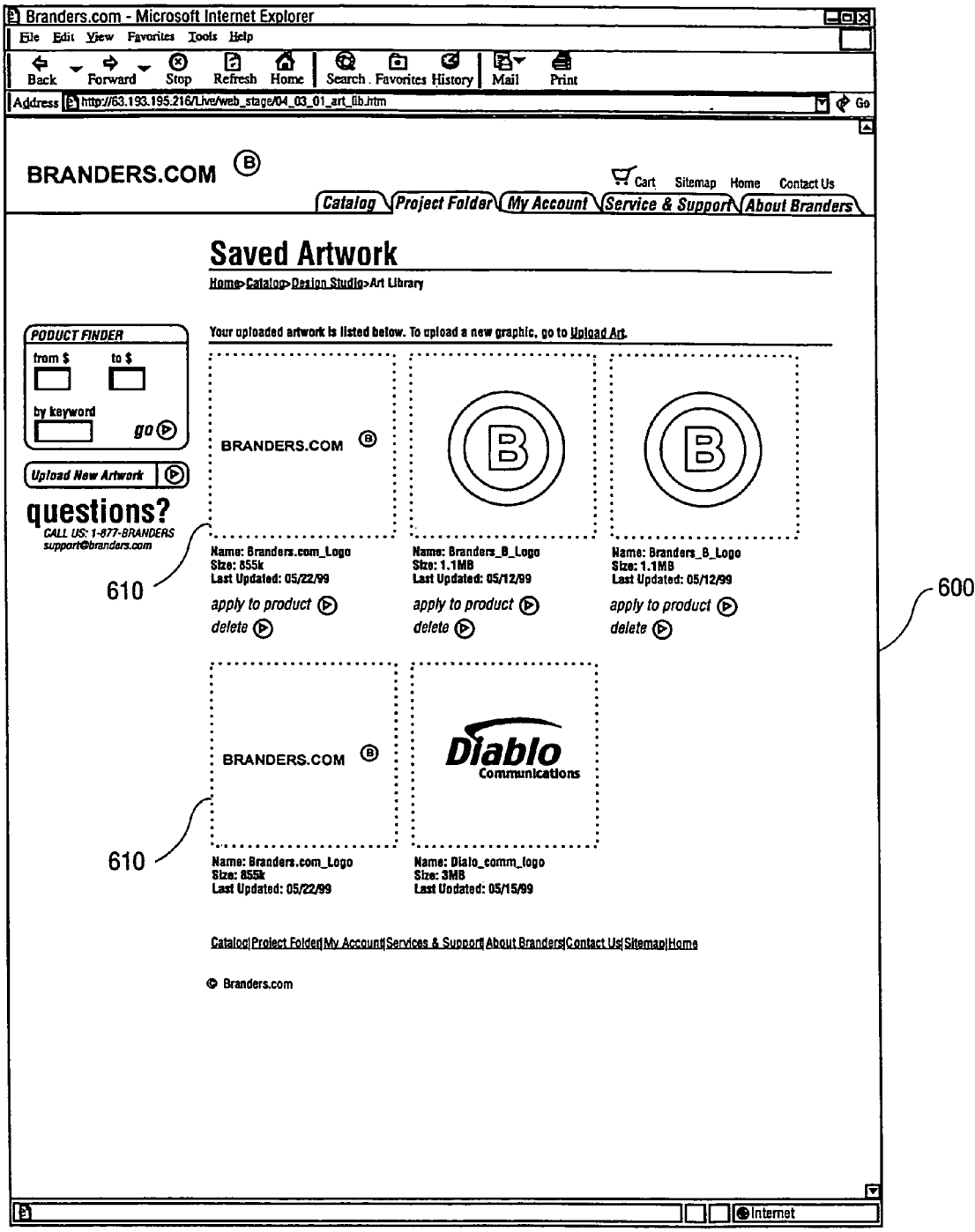
FIG. 6 is a Web interface presented on the browser that enables selection of a decorative image according to one embodiment of the present invention.
Figure 7:
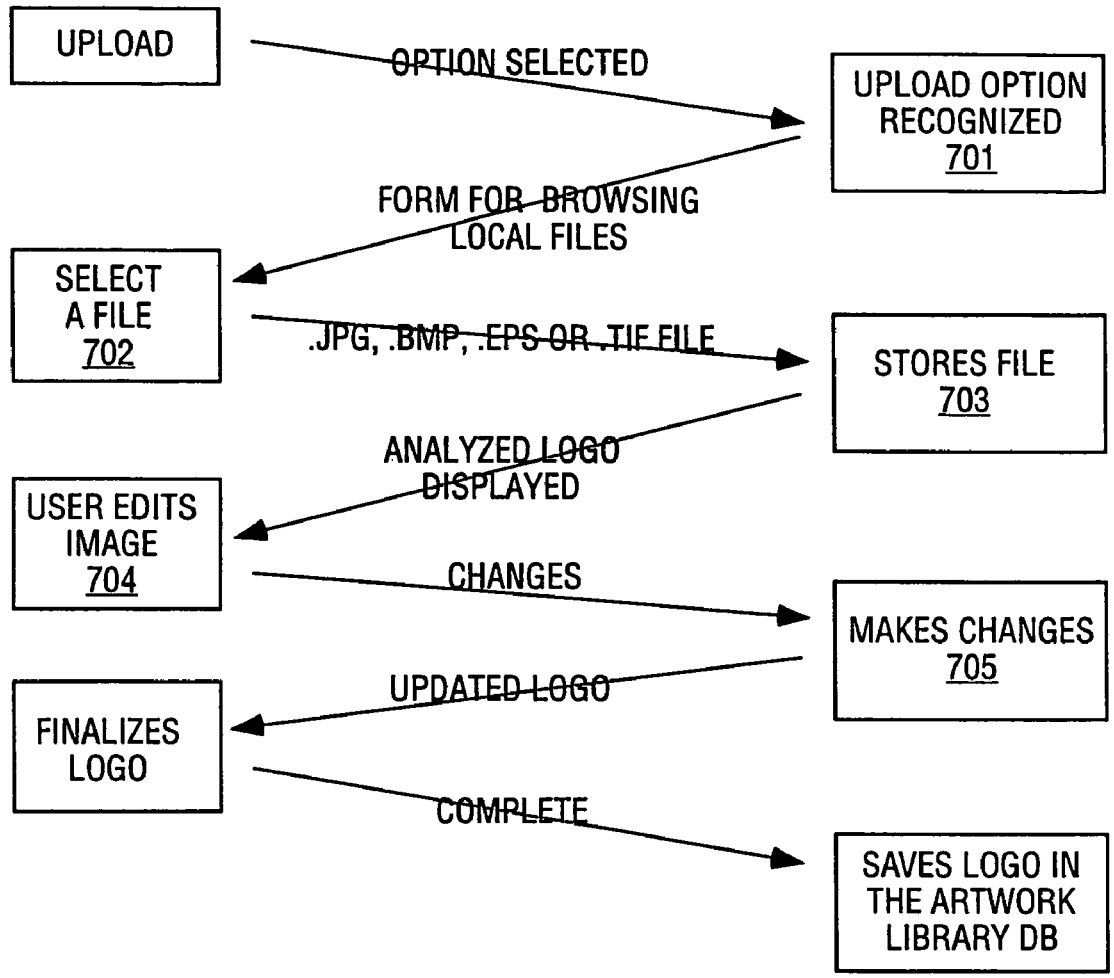
FIG. 7 is a flow diagram illustrating a process of uploading the decorative image to a server according to one embodiment of the present invention.

After selecting a product for design, the user may select the second image, at operation 307, which may be artwork, such as a logo. It is customary for businesses to have several versions of a company's logo, these versions can be stored in the customer database, and upon customer login may be transferred to a Web browser for display. An exemplary user interface 600 to present user's logos 610 is shown in FIG. 6. In an alternative, the user may upload a logo from the client to the visualization server 150 through operations illustrated in FIG. 7. At 701 upon user's selection of upload option the user is presented with a form for browsing files stored at the local computer. At operation 702 the user selects a file that may be a .jpg, .bmp, .eps, or .tif and uploads it to the visualization server 150 where the number of colors and transparent area are detected by the artwork creation engine 180. The visualization server 150 displays the analyzed logo on the Web browser on a specialized background, at operation 703. At this point 704, the user may edit artwork transparency areas and submit changes to the visualization server 150. The server then, at 705, re-displays the logo with the changes on the Web browser. Upon satisfaction with the logo the user may save the logo and associated data in an artwork library database at the visualization server 150.

Figure 8:
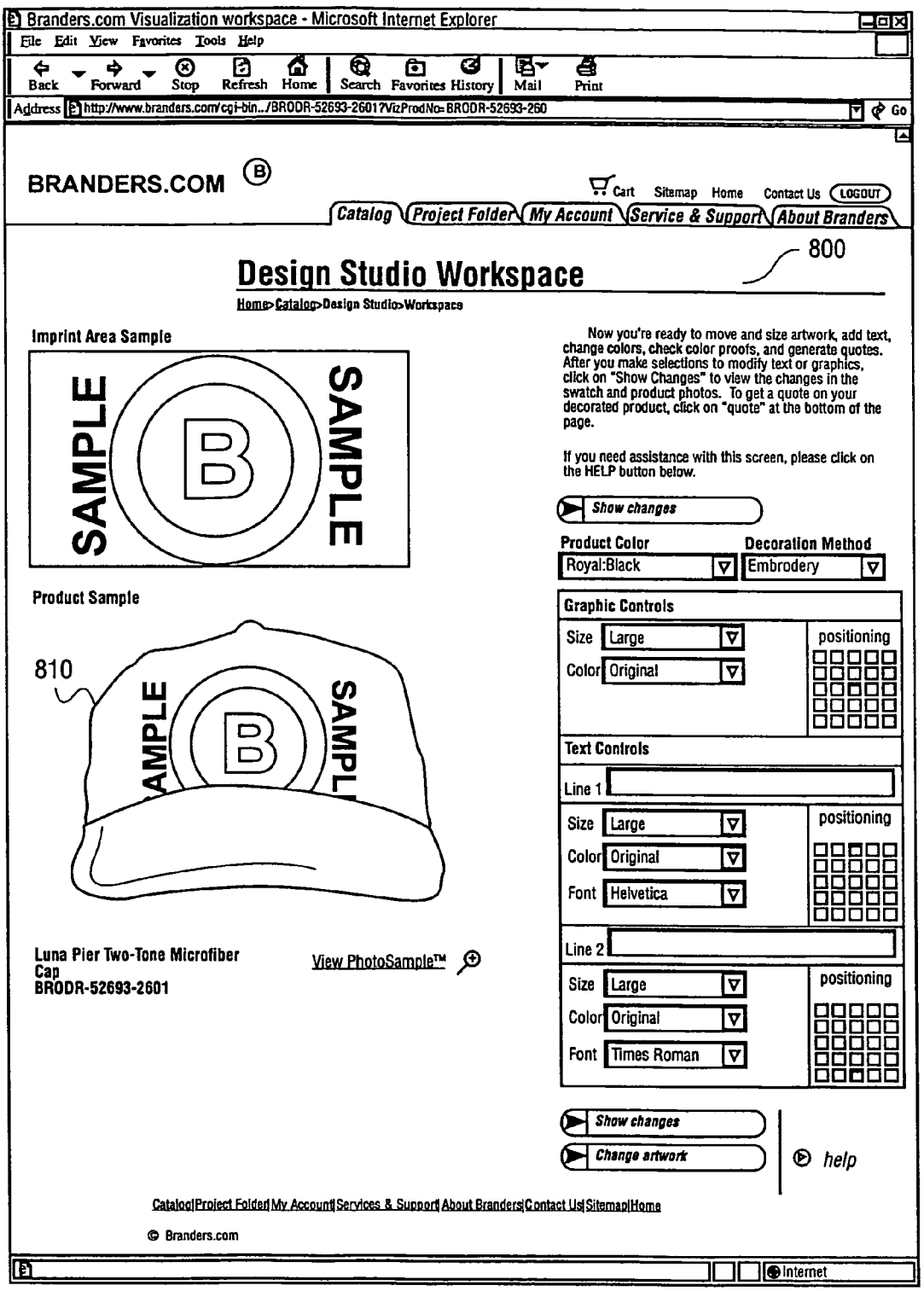
FIG. 8 is a Web interface presented on the browser that presents a default composite image according to one embodiment of the present invention.
Figure 9:
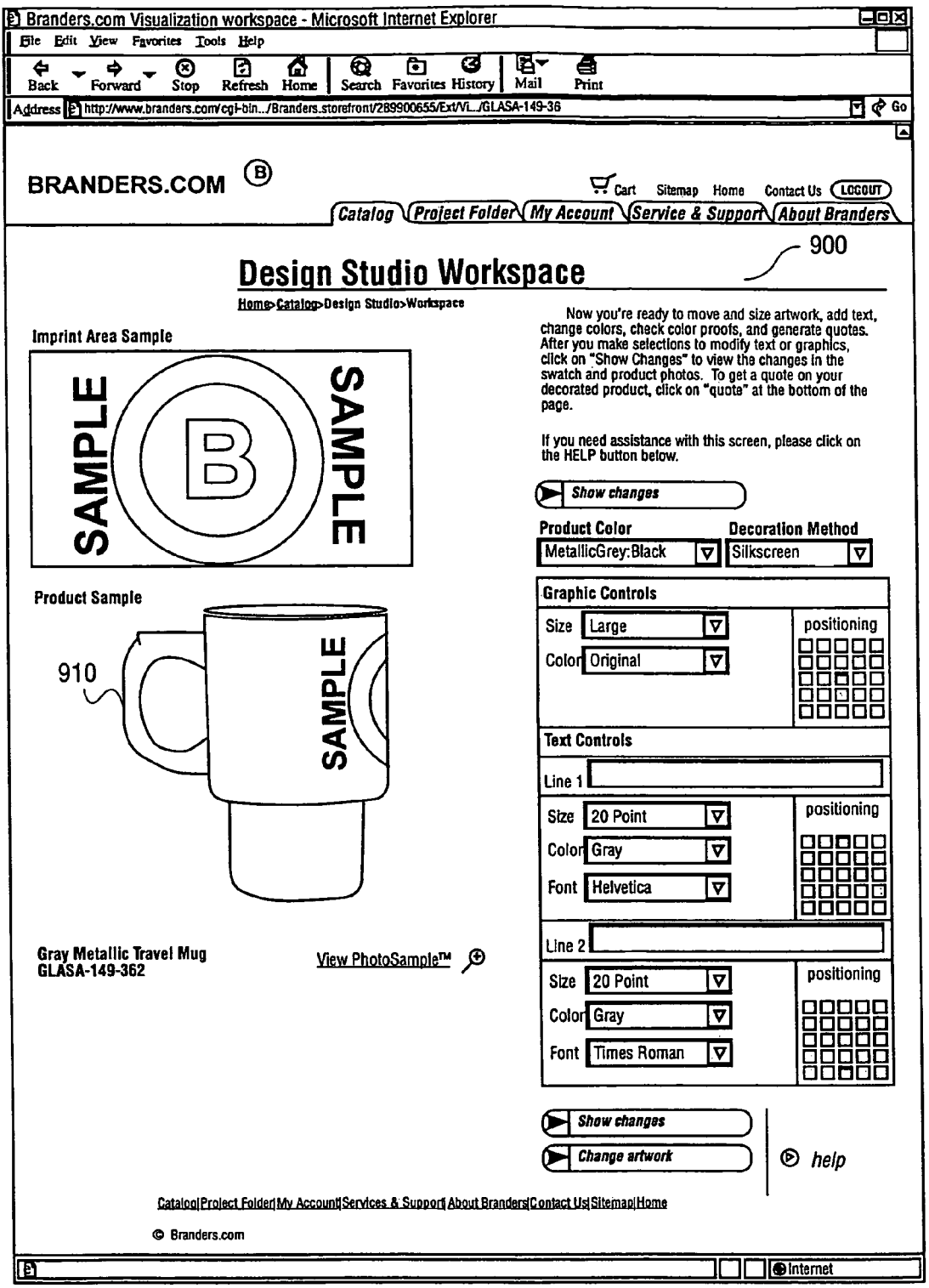
FIG. 9 is a Web interface presented on the browser that presents a composite image generated according to a warp ratio according to one embodiment of the present invention.

Returning to FIGS. 3A and 3B, when the user finalizes the product choice and logo selection the server communicates the composite image to the browser via the network, illustrated as operation 309 of FIG. 3A, and the composite image of the product and the logo is displayed at the Web browser, where the logo is placed in a default position on the product, e.g. the logo will be placed in the center of a baseball cap as a default. An exemplary user interface 800 to present a default composite image 810 is shown in FIG. 8. Necessary warping is applied by the compositing engine 160 when generating default composite image. The product image file selected by the user contains warping information, e.g. warp ratio, in the header of the file. The compositing engine 160 places the logo image on the product image according to the warp ratio. An exemplary user interface 900 to present a composite image 910 containing warping is shown in FIG. 9. The warping may be cylindrical or spherical, however, it will be appreciated that the warping ratio may be further defined to address other types of product image topography, e.g. undulating, cubist, etc.

Figure 10:
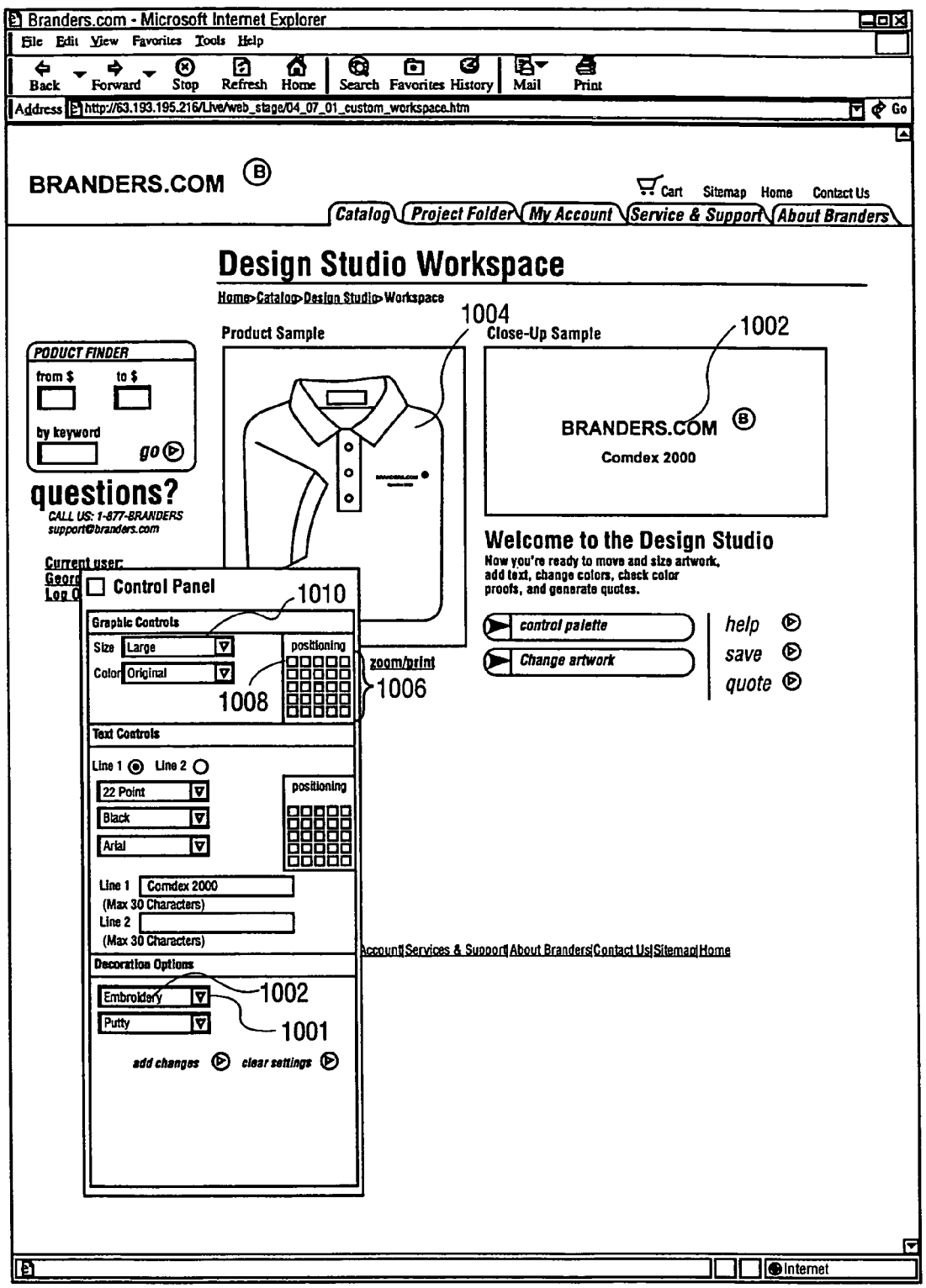
FIG. 10 is a Web interface presented on the browser that enables positioning of the logo image relative to a product image according to one embodiment of the present invention.
Figure 11:
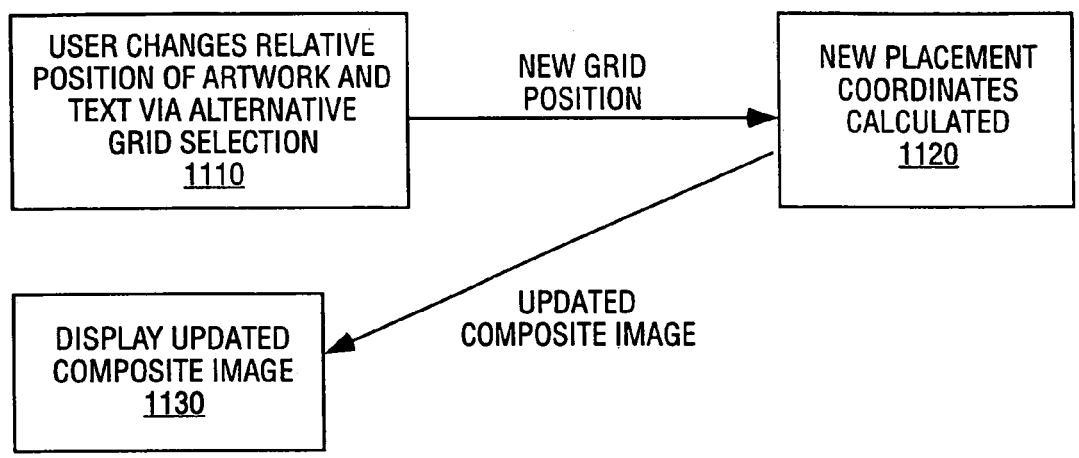
FIG. 11 is a flow diagram illustrating a process of relative positioning of the logo image.

However, the user is not limited by the default composite image. In one embodiment, the user can selectively position a logo image relative to the product image by selecting a position on a positioning grid 1006 presented, at 1110 of FIG. 11, via a Web interface on the browser, as illustrated in exemplary user interface of FIG. 10. For example, the user may select block 1008 in positioning grid 1006 by navigating a cursor over block 1008 and clicking on it. The selecting of block 1008 generates positioning information that is communicated to the visualization server. Upon the user changing relative position of artwork and text, new placement coordinates are calculated by the visualization server 150 based on the grid selection, size of the artwork and text and imprint area at 1120 of FIG. 11. This method would be best described by the following example. Let the grid be 5 blocks by 5 blocks, as illustrated in FIG. 10. The imprint algorithm 165 of FIG. 1 divides the imprint area by 5 and performs relative positioning upon the user selecting grid blocks. For example, if an imprint area is a 1-inch rectangle then a change by one block is $^2/_{10}$ of an inch move. The changes are being sent to the visualization server 150, where the image 1004 is being re-composited and re-displayed on the screen at 1130 of FIG. 11.

In addition, the visualization server 150 makes some assumptions about the size of the logo when generating the default composite image, and the user is given an option to modify it. The user may be presented with a drop down menu 1010, where the user may select the desired size by selecting and clicking on a small, medium or large option. Upon receiving the request the visualization server 150 re-sizes the image, re-composites the image and re-displays it on the Web browser. For example, if the user wants the logo to be of a small size, the visualization server 150 may re-size the logo to a 33% of an original logo image.

FIG. 10 illustrates an example of a Web interface presented on a browser that allows the user at the client side to select a manufacturing process filter to use in generating a composite image. In one embodiment, the user is presented a selection of filters via a Web interface presented on the browser. For example, the user may be presented a display of manufacturing techniques or processes in a selection box 1001. For example, the selection box may display a drop down menu of options for selection by the user. The user may then select a filter 1002, for example, by scrolling down the drop down box and clicking on a selected filter. The selection of the filter generates filtering information that is communicated to the visualization server 150. This filtering information is used in generating the composite image so that the logo appears applied to the product image according to the selected filter, i.e., embroidery, silk-screening, engraving, etc. This technique is accomplished by the usage of filters that are well known in the art.

Figure 3A:
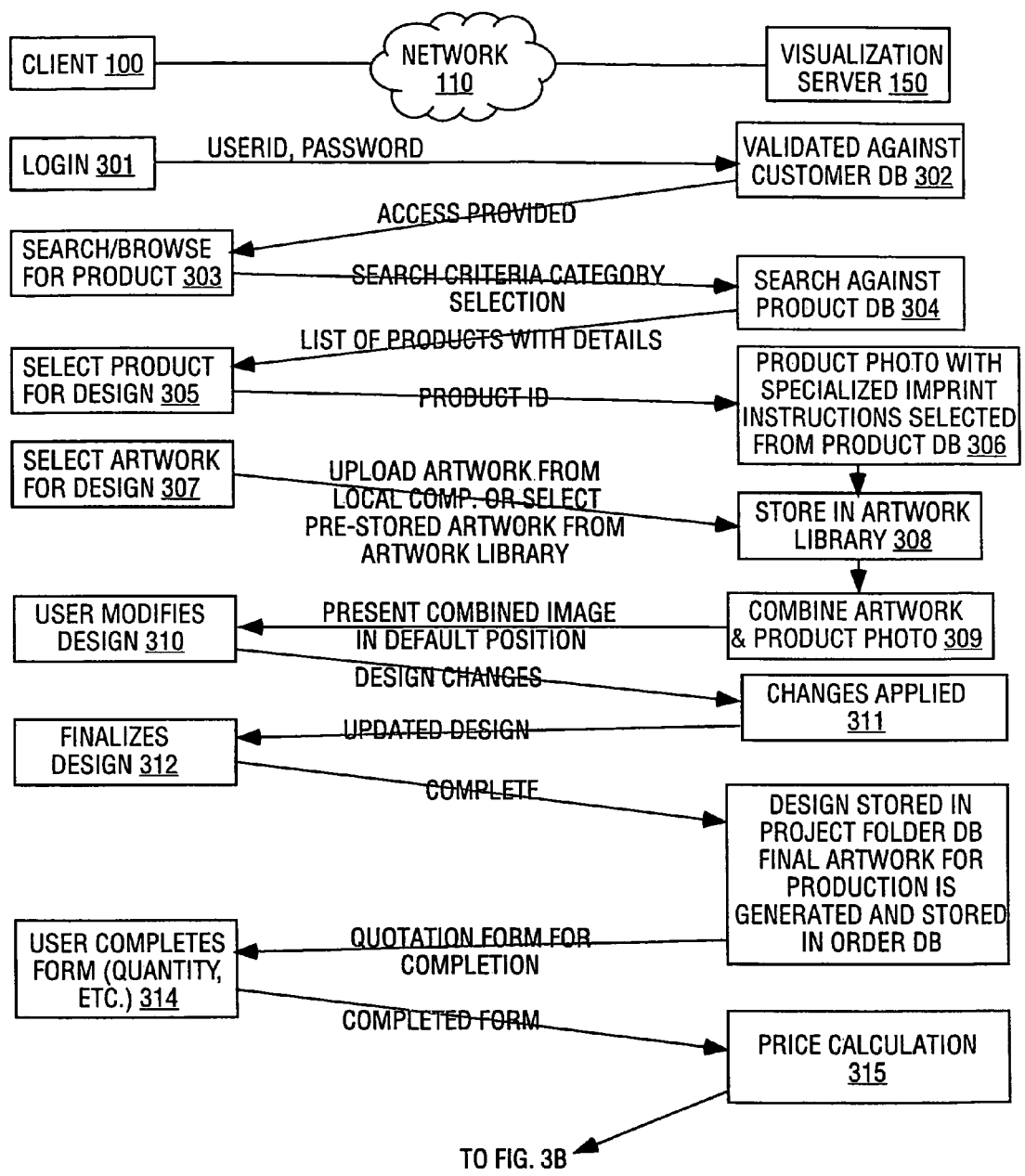
FIGS. 3A and 3B are a flow diagram illustrating server side processes and client side processes utilized in generating a composite image according to one embodiment of the present invention.
Figure 12:
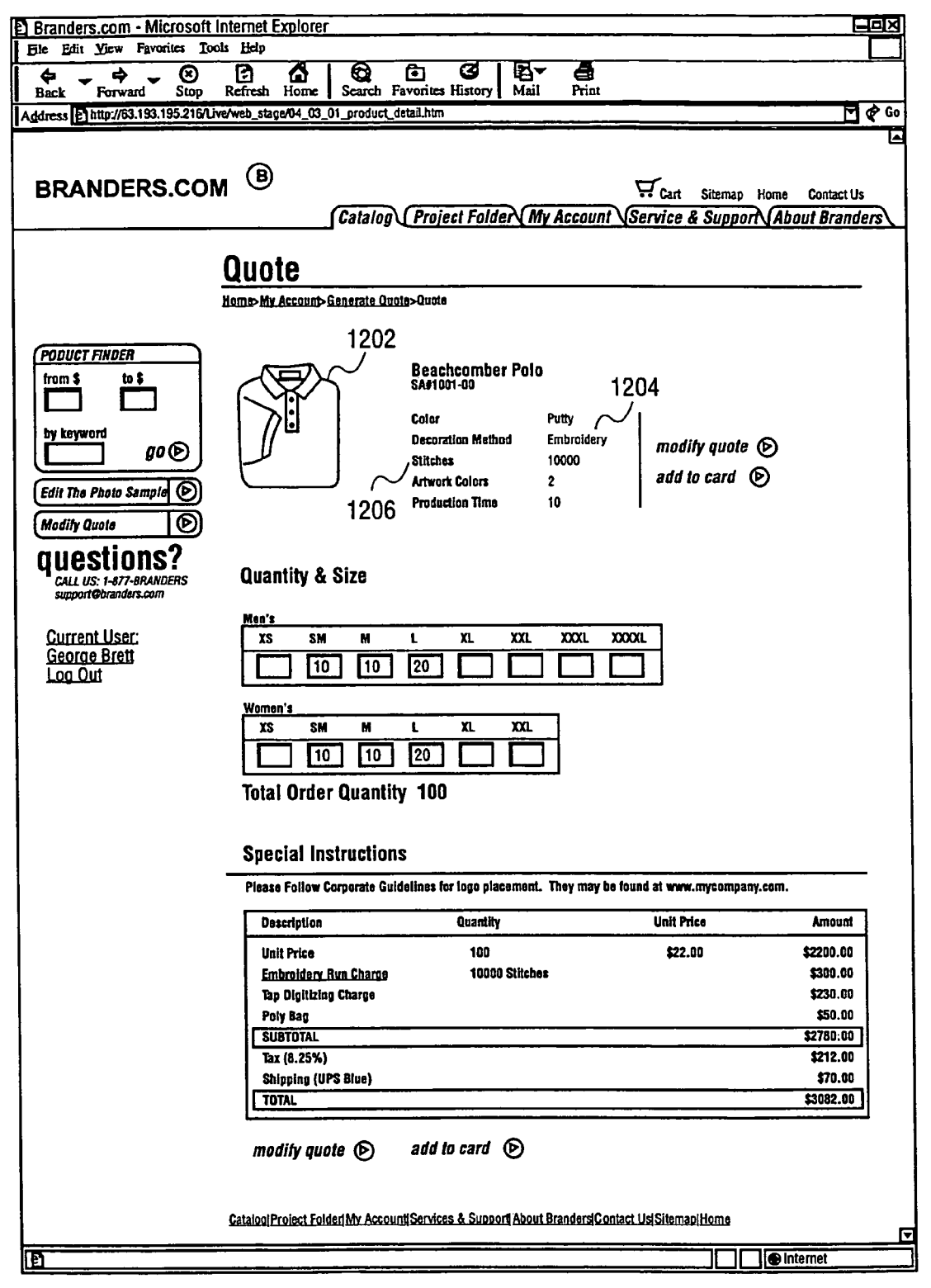

Upon completion of operation 312 of FIG. 3A, the design is stored in a project folder database at the visualization server 150 and final artwork for production is generated and stored in an order database at 313. The user is then presented with a quotation form, illustrated in FIG. 12, where such information as quantity, color, decoration process, special instructions from the customer, etc. needs to be filled out. Upon the user completing the form the visualization server 150 calculates the price for the order at operation 315 of FIG. 3A. An automatic and accurate price calculation is one of the goals of the present invention. The price of the promotional product with the imprinted logo depends on the methods of manufacturing. For example, if imprint is done by the method of embroidery then the number of stitches determines the price of the order. When the final design is finalized by the user and the visualization server 150 is ready to calculate the quote, the number of stitches is calculated. The number of stitches is directly proportional to the size of the logo and depends on the ratio of non-blank pixels to the imprint area. The visualization server 150 measures the number of pixels occupied by the artwork and calculates this area in square inches, then multiplies the area by the average number of stitches per square inch that is stored in the header of the product image file.

(Logo area in square inches)×(Average number of stitches per square inch) This calculation technique allows the user to rely on pricing before placing the order, rather than waiting for the embroider to apply the design and then determine the number of stitches used in making the final design. For example, if an imprint area is 200 pixels and it is 5 inches wide, and the logo is 100 pixels, then two and a half inches is going to be multiplied by the average number of stitches per square inch. In another embodiment of the present invention, the average number of stitches per square inch can be user-modified. The only change that needs to be made to the above calculation process is that instead of retrieving the average number of stitches from the header of the product image file, the value is sent to the visualization server 150 upon the user entering it at the Web browser. Based on the calculated or user-modified number of stitches per square inch and an embroidery price provided by various embroiders the fixed price quote may be calculated.

The user is then presented with the fixed price quote and a photo sample according to the information stored in the databases (i.e. product database, order database). The photo sample addresses the need for a pre-production proof feature that is well known in the industry. Instead of waiting for a manufacturer to complete a sample of a promotional product, the user can view the final product on the Web browser in the comfort of his/her own office.

In one embodiment of the present invention, the photo sample image may be generated to include filtering so that the composite image simulates the appearance of the logo applied to the product according to a selected manufacturing process or technology. In another embodiment of the present invention, the user may zoom in and out of the photo sample to view the image in greater detail. This feature is implemented using the techniques well known in the art.

In one embodiment of the present invention, the user may choose to send a finalized image for approval to a supervisor. Upon selection of this option, the visualization server 150 compiles an e-mail message and sends it to a specified e-mail address with an image of the final design, or, in the alternative, with the URL of the Web site where the final design image may be viewed.

Figure 3B:
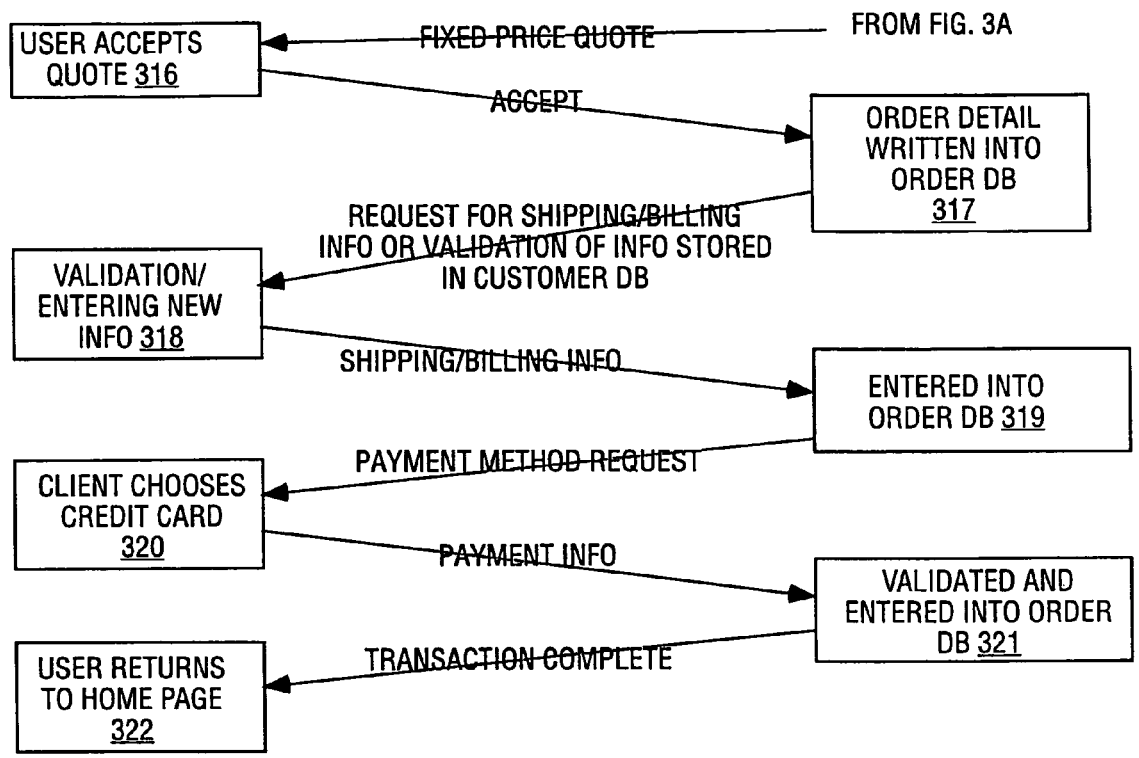

Upon accepting the fixed price quote, operation 316 of FIG. 3B, the order details are written into the order database on the visualization server 150. The request for shipping and billing information is being displayed on the Web browser for the user to fill out. In the alternative, the customer shipping and billing information stored in the customer database may be displayed on the Web browser for validation. When shipping and billing information is validated or entered into the order database, the payment method is requested. Upon entering of the payment method at 320 and validation of it at 321, the transaction with the user is complete. At this point the order, shipping and billing information is formatted and sent to the supplier. In one embodiment of the present invention all the necessary information about the customer order is formatted into an email message form and sent to a supplier.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An apparatus comprising:
   a first image database, the first image database to store at least one first image file, wherein the at least one first image file includes a product image file including a digital photograph of a physical product and a header including a size and an imprint area for the physical product;
   a second image database, the second image database to store at least one second image file; and
   a server to receive a user selection of the at least one first image file and the at least one second image file, and to generate a composite image of a first image and a second image, wherein the first image includes the digital photograph of the physical product and the second image is positioned relative to the first image based on the size and the imprint area included in the header of the first product image file.

2. The apparatus of claim 1, wherein the product image file is a .png file.

3. The apparatus of claim 1, wherein the at least one first image file and the at least one second image file are formatted as a raster file.

4. The apparatus of claim 1, wherein the first image database includes a product thumbnail file associated with the first image file.

5. A method comprising:
   generating a product image file including coding a digital photograph of a physical product sample with header information including a size and an imprint area; and
   storing the product image file in a product database for later use in generating a composite image, the composite image having a second image initially positioned on the digital photograph of the physical product based on the size and the imprint area.

6. The method of claim 5, wherein generating the product image file includes:
   receiving a physical product sample and a product information for the physical product sample, the product information including a size and an imprint area;
   taking a digital photograph of the physical product sample.

7. The method of claim 5, wherein generating the product image file includes receiving a product photo file including the digital photograph of the physical product sample.

8. The method of claim 5, further including:
   generating the composite image based on a selection of the product image file and a selection of the second image file.

9. The method of claim 5, further including:
   generating the second image including,
      selecting a file;
      uploading the file to an artwork creation engine;
      detecting a number of colors and one or more transparent areas in the file to generate an analyzed logo based on the uploaded file; and
      displaying the analyzed logo.

10. The method of claim 9, furthering including:
    editing the one or more transparent area; and
    re-displaying the submitted changes to the analyzed logo.

11. A method comprising:
    accessing a visualization server through a network using a network browser;
    communicating to the network browser a virtual products catalog including a list of one or more products, wherein each of the one or more products includes at least one imprint instruction;
    receiving from the network browser a first indication of a selection of a particular product from the virtual products catalog;
    receiving from the network browser a second indication of a selection of an image to be used to decorate the particular product; and
    generating a composite image of the particular product having the image to be used to decorate the particular product in a position on the particular product based on the at least one imprint instruction for the particular product.

12. The method of claim 11, further including:
    communicating to the network browser the composite image including the particular product and the second image placed in the position on the particular product.

13. The method of claim 11, wherein receiving from the network browser a first indication of a selection of a particular product from the virtual products catalog includes:
    sending to the visualization server a unique product identification number based on the selected particular product, the unique product identification number operable to allow the visualization server to select a correct product photo including the at least one imprint instruction from the virtual products catalog based on the selected particular product.

14. The method of claim 11, wherein the list is stored in at least one product image database.

15. A method comprising:
accessing a visualization server through a network using a network browser;
receiving at the visualization server a search request;
conducting a search for a product against a product database coupled to the visualization server based on the search request;
communicating to the network browser a list of products identified by the visualization server and stored in the product database as a result of the search, each of the products having imprint instructions;
receiving from the network browser a first indication of a selection of a particular product from the list;
receiving from the network browser a second indication of a selection of an image to be used to decorate the particular product; and
generating a composite image of the particular product having the image to be used to decorate the particular product in a position on the particular product based on the imprint instructions associated with the particular product.

16. The method of claim 15, wherein generating the composite image includes filtering so that the composite image simulates the appearance of a decoration applied to the particular product according to a selected manufacturing process.

17. The method of claim 15, further including:
storing the composite image in a project folder database coupled to the visualization server.

18. A method comprising:
receiving at a server a finalized design including a composite image having a first image and a second image positioned on the first image based on imprinting information associated with the first image;
storing the finalized design in a project folder database;
generating final artwork for production of the finalized design;
storing the final artwork in an order database;
generating a quotation form, the quotation form including one or more inputs for information;
communicating to a network browser the generated quotation form;
receiving from the network browser and at the server a filled out quotation form, wherein the information has been provided as part of the filled out quotation form;
calculating a price quote for an order based on the filled out quotation form; and
communicating to the network browser both the price quote for the order and a photo sample based on the composite image.

19. The method of claim 18, further including:
receiving from the network browser at the server an indication of acceptance of the price quote; and
writing the order into the order database.

20. The method of claim 19, further including:
communicating to the network browser a request for shipping and billing information;
receiving from the network browser the shipping and billing information; and
entering the shipping and billing information into the order database.

21. The method of claim 19, further including:
communicating to the network browser a shipping and billing information stored in a customer database;
receiving from the network browser a validation of the shipping and billing information; and
upon receiving the validation, entering the shipping and billing information into the order database.

22. The method of claim 21, further including:
communicating to the network browser a request for a payment method;
receiving at the server an indication of a chosen payment method;
validating the chosen payment method; and
upon validation of the chosen payment method, formatting and sending the order and the shipping and billing information to a supplier.

23. The method of claim 22, wherein formatting the order, shipping and billing information includes formatting the order, shipping and billing information into an email message.

24. The method of claim 22, wherein the chosen payment method is a credit card.

25. A method for generating a composite image including:
presenting a first image via a Web interface presented on a browser, the first image being generated from a product image file including a definition for an alpha channel;
presenting a second image via a Web interface presented on the browser;
communicating a selection of the first image and the second image to a server via a network; and
automatically generating a composite image of the first image and the second image at the server, the automatic generation of the composite image including using the alpha channel as a mask to determine how a plurality of pixels' colors should be merged when overlaid in the composite image.

26. The method of claim 25, wherein the alpha channel includes transparency information.

27. The method of claim 25, wherein a plurality of different parts of the second image have a plurality of different levels of transparency.

* * * * *

UNITED STATES PATENT AND TRADEMARK OFFICE
CERTIFICATE OF CORRECTION

| | | |
|---|---|---|
| PATENT NO. | : 7,835,591 B2 | Page 1 of 1 |
| APPLICATION NO. | : 11/943540 | |
| DATED | : November 16, 2010 | |
| INVENTOR(S) | : Larry Lunetta et al. | |

It is certified that error appears in the above-identified patent and that said Letters Patent is hereby corrected as shown below:

On the title page, item (75), in "Inventors", in column 1, line 2, delete "Elliot" and insert -- Eliott --, therefor.

Signed and Sealed this

Eighteenth Day of January, 2011

David J. Kappos
*Director of the United States Patent and Trademark Office*